United States Patent
Kim

(10) Patent No.: US 10,438,410 B2
(45) Date of Patent: Oct. 8, 2019

(54) TEXT ENHANCEMENTS FOR HEAD-MOUNTED DISPLAYS

(71) Applicant: Intel Corporation, Santa Clara, CA (US)

(72) Inventor: Kahyun Kim, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 14/978,023

(22) Filed: Dec. 22, 2015

(65) Prior Publication Data

US 2017/0176748 A1    Jun. 22, 2017

(51) Int. Cl.
| | |
|---|---|
| *G06T 19/00* | (2011.01) |
| *G01C 21/16* | (2006.01) |
| *G01C 21/36* | (2006.01) |
| *G02B 27/01* | (2006.01) |
| *G02B 27/00* | (2006.01) |

(52) U.S. Cl.
CPC ............ *G06T 19/006* (2013.01); *G01C 21/16* (2013.01); *G01C 21/3655* (2013.01); *G02B 27/0093* (2013.01); *G02B 27/017* (2013.01); *G02B 2027/014* (2013.01); *G02B 2027/0118* (2013.01); *G02B 2027/0141* (2013.01); *G02B 2027/0147* (2013.01); *G02B 2027/0183* (2013.01)

(58) Field of Classification Search
CPC .......... G02B 27/017; G02B 2027/0178; G02B 2027/0141; G06T 19/006; G06T 2215/16; G06T 11/60; G06T 7/20; G06F 3/012
See application file for complete search history.

(56) References Cited

U.S. PATENT DOCUMENTS

| | | | |
|---|---|---|---|
| 8,922,590 B1 * | 12/2014 | Luckett, Jr. | ............ G09G 5/377 345/633 |
| 9,213,185 B1 * | 12/2015 | Starner | ................ G02B 27/017 |
| 2012/0105483 A1 | 5/2012 | Fedorovskaya et al. | |
| 2013/0258127 A1 | 10/2013 | Jang | |
| 2013/0336629 A1 | 12/2013 | Mulholland et al. | |

(Continued)

FOREIGN PATENT DOCUMENTS

WO    WO-2015168043 A1    11/2015

OTHER PUBLICATIONS

"International Application Serial No. PCT/US2016/063082, International Search Report dated Feb. 7, 2017", 3 pgs.

(Continued)

*Primary Examiner* — Jeffrey J Chow

(74) *Attorney, Agent, or Firm* — Schwegman Lundberg & Woessner, P.A.

(57) ABSTRACT

Various systems and methods for implementing text enhancements in augmented reality content presented in a head-mounted display are described herein. A head-mounted display system for implementing enhancements in augmented reality content includes a see-through display device to display augmented reality content in a field of view to a user of the system, the augmented reality content in an initial format; an accelerometer; and a controller to: detect a trigger event, the trigger event based on motion of the head mounted display system as measured by the accelerometer; and present an enhanced version of the augmented reality content when the trigger event is detected.

20 Claims, 8 Drawing Sheets

(56) References Cited

U.S. PATENT DOCUMENTS

| | | | |
|---|---|---|---|
| 2014/0098137 A1* | 4/2014 | Fein | G06T 11/60 |
| | | | 345/633 |
| 2014/0132484 A1* | 5/2014 | Pandey | G02B 27/0172 |
| | | | 345/8 |
| 2014/0361971 A1 | 11/2014 | Sala | |
| 2014/0375679 A1 | 12/2014 | Margolis et al. | |
| 2014/0375789 A1 | 12/2014 | Lou et al. | |
| 2015/0002373 A1* | 1/2015 | Kobayashi | G02B 27/017 |
| | | | 345/8 |
| 2015/0022542 A1* | 1/2015 | Baba | G02B 27/017 |
| | | | 345/589 |
| 2015/0279102 A1* | 10/2015 | Fleck | G06T 19/006 |
| | | | 345/419 |
| 2015/0294505 A1* | 10/2015 | Atsmon | G06T 19/006 |
| | | | 345/633 |

OTHER PUBLICATIONS

"International Application Serial No. PCT/US2016/063082, Written Opinion dated Feb. 7, 2017", 7 pgs.

* cited by examiner

TEXT ENHANCEMENTS FOR HEAD-MOUNTED DISPLAYS

TECHNICAL FIELD

Embodiments described herein generally relate to user interfaces and in particular, to text enhancements for head-mounted displays.

BACKGROUND

Augmented reality (AR) viewing may be defined as a live view of a real-world environment whose elements are supplemented (e.g., augmented) by computer-generated sensory input such as sound, video, graphics, or GPS data. A head-mounted display (HMD), also sometimes referred to as a helmet-mounted display, is a device worn on the head or as part of a helmet that is able to project images in front of one or both eyes. An HMD may be used for various applications including augmented reality or virtual reality simulations. HMDs are used in a variety of fields such as military, gaming, sporting, engineering, and training.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Systems and methods described herein implement text enhancements in augmented reality content presented in a head-mounted display (HMD). HMDs come in a variety of form factors including goggles, visors, glasses, helmets with face shields, and the like. As technology improves, HMDs are becoming more affordable for consumer devices and smaller and lighter to accommodate various applications. However, when using an HMD during some activities, the text and other objects may become difficult to read or perceive due to the motion of the user's head, eyes, or the HMD, or combinations of such motion.

Figure 1:
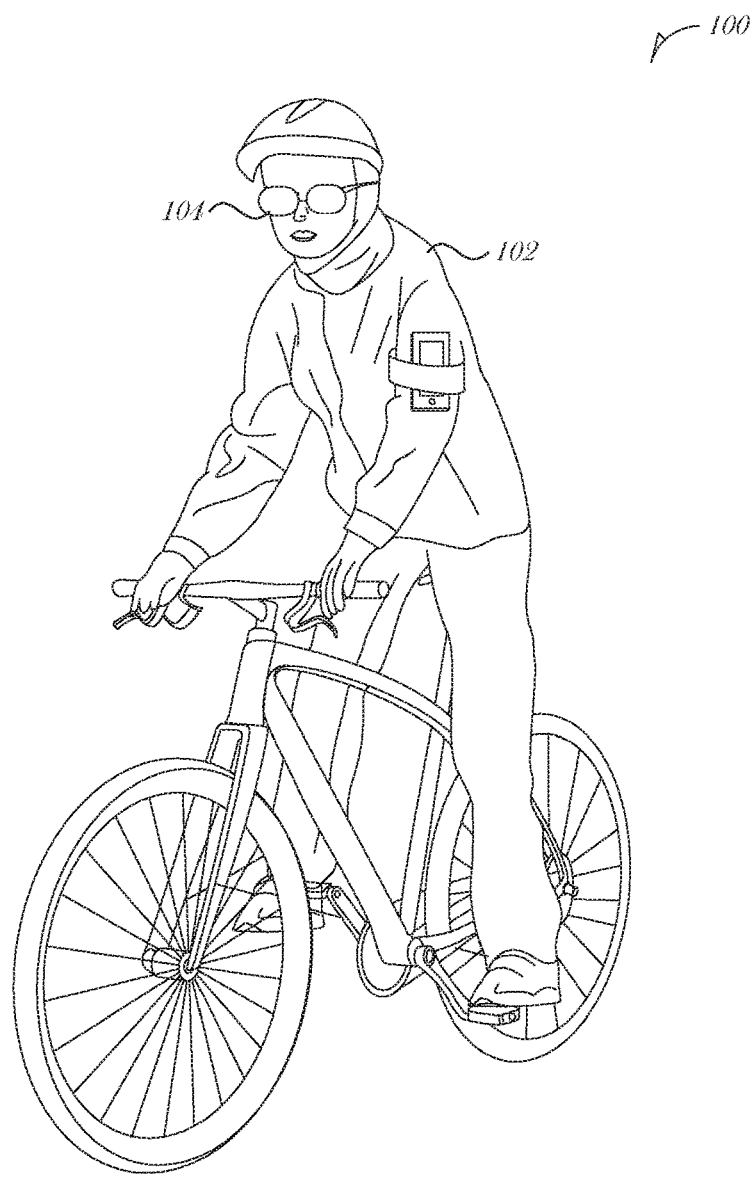
FIG. 1 is a diagram illustrating an environment where a user is performing an activity within the environment, according to an embodiment.

FIG. 1 is a diagram illustrating an environment 100 where a user 102 is performing an activity within the environment 100, according to an embodiment. In particular, the user 102 is biking through the environment 100. In some environments, such as off road, a trail, or other uneven ground, the user's head may move as the bicycle traverses rocks, bumps, and other obstacles. When the user's head moves, the user's eyes move and an HMD 104 may also move relative to her face/head. The HMD 104 may be loosely affixed to the user's head, such as may be the case when the HMD 104 is in the form of smart glasses as illustrated in FIG. 1. Even if the HMD 104 were affixed more sturdily, as may be the case with a ski goggle type HMDs, the HMD 104 may still vibrate or shift slightly enough to impair the user's ability to view the presentation on the interior portion of the HMD 104.

In some activities, such as the one illustrated in FIG. 1, the user 102 may not be able to easily or safely use their hands to adjust an auxiliary device (e.g., smartphone) or the HMD 104 directly. Distractions may be dangerous for a runner, biker, driver, or other participant, and may also be a distraction for those who are in a race, for example, or during a snowstorm, when attention is imperative. Manual adjustment in these cases is impractical.

Thus, in an embodiment, the HMD 104 is equipped with onboard systems that monitor the state of the HMD 104 and automatically adjust the display provided by the HMD 104 based on the state. The HMD 104 may be equipped with one or more sensor (e.g., accelerometers, gyrometers, or magnetometers) to determine the state of the HMD 104 and optionally the state of the user 102. Based on the determined state, the HMD 104 may enhance text or other objects being displayed by the HMD 104.

Figure 2:
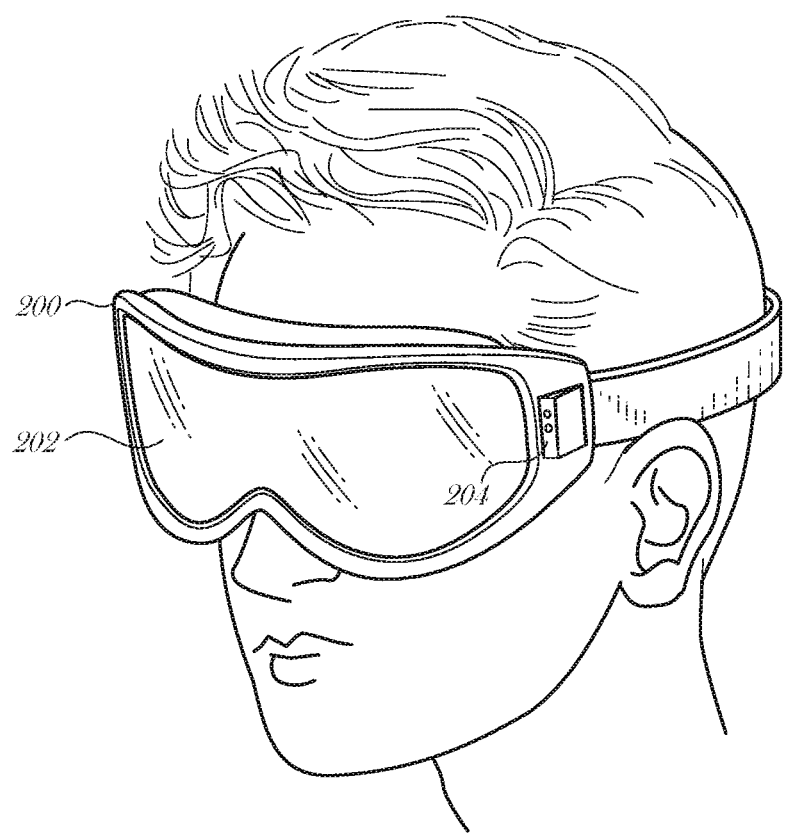
FIG. 2 is a HMD, according to an embodiment.

FIG. 2 is an HMD 200, according to an embodiment. The HMD 200 includes a see-through display surface 202, a camera array 204, and processing circuitry (not shown). An image or multiple images may be projected onto the display surface 202, such as is done by a microdisplay. Alternatively, some or all of the display surface 202 may be an active display (e.g., an organic light-emitting diode (OLED)) able to produce an image in front of the user. The display also may be provided using retinal projection of various types of light, using a range of mechanisms, including (but not limited to) waveguides, scanning raster, color-separation and other mechanisms.

The camera array 204 may include one or more cameras able to capture visible light, infrared, or the like, and may be used as 2D or 3D cameras (e.g., depth camera). The camera array 204 may be configured to detect a gesture made by the user (wearer) and the processing circuitry may use the gesture to capture images of text identified by the gesture, process the images (e.g., with optical character recognition), and render an image on the display surface 202 for the user.

The HMD 200 may optionally include one or more inward facing sensors (not shown) to sense the user's face, skin, or eyes, and determine a relative motion between the HMD 200 and the detected face, skin, or eyes. The inward facing sensors may be mounted to an interior portion of the HMD 200, such as in the goggles housing, on the lens, or on a projecting portion of the HMD 200, in various embodiments. The relative motion may be used to detect a situation where the user may not be able to easily read or see objects projected by the HMD 200 on the display surface 202.

Figure 3:
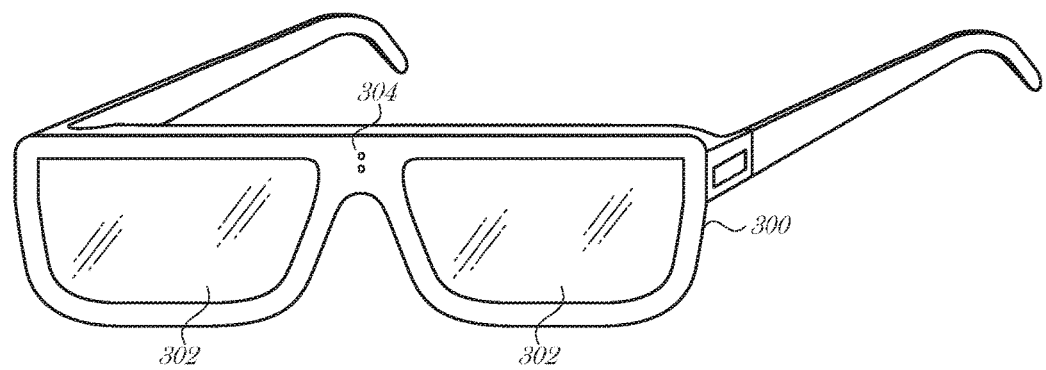
FIG. 3 is another HMD, according to embodiment.

FIG. 3 is another HMD 300, according to embodiment. The HMD 300 in FIG. 3 is in the form of eyeglasses. Similar to the HMD 200 of FIG. 2, HMD 300 includes two display surfaces 302 and a camera array 304. Processing circuitry (not shown) may perform the display functions described herein.

Figure 4A:
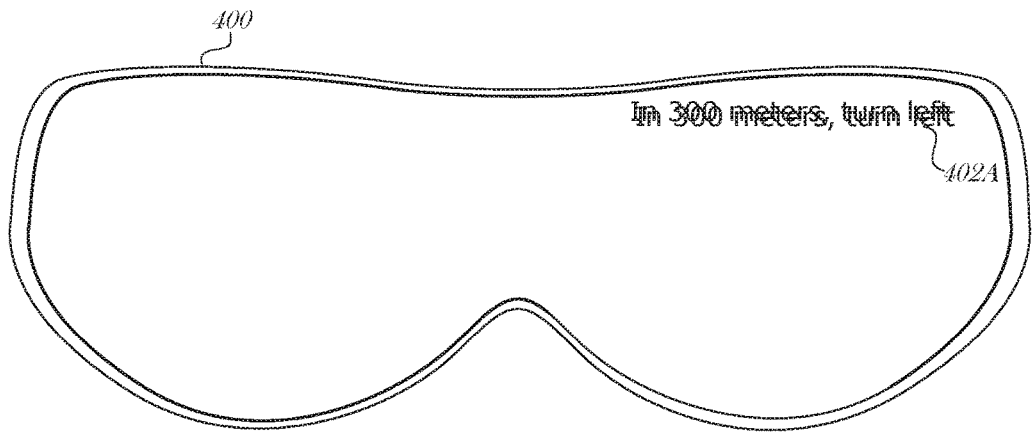
FIGS. 4A and 4B illustrate text enhancements, according to an embodiment.
Figure 4B:
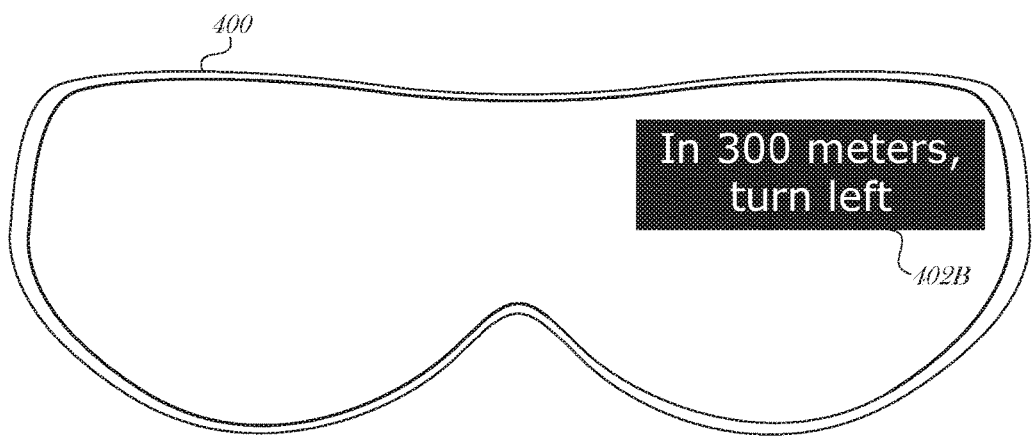

FIGS. 4A and 4B illustrate text enhancements, according to an embodiment. When the sensors in an HMD 400 detect a triggering event, which may be a threshold amount of vibration, acceleration, movement, or the like of the HMD 400, or a threshold amount of movement of the HMD 400 relative to the user's face.

In FIG. 4A, the HMD 400 is presenting augmented reality (AR) content 402A. The AR content 402A may be any type of content including, but not limited to text, images, video, or combinations thereof. Because of vibration, movement, or other motion, the AR content 402A may appear blurry or otherwise difficult for the user to see. The AR content 402A may appear as a double image, such as that illustrated in FIG. 4A.

Sensors in the HMD 400 may detect a threshold amount of movement and in response, enhance the AR content 402A in one or several ways. For example, the AR content 402A may be enlarged (e.g., zoomed). As another example, the AR content 40A2 may be presented with a different color background to enhance the relative contrast between the ARA content 402 and the real-world environment being seen through the HMD 400. As yet another example, the AR content 402A may be initially presented with a border, background, or the like of a certain translucency, which after detecting more than a threshold amount of movement, the HMD 400 may adjust the opacity of the AR content 402A to improve contrast, remove distracting see-through images, and the like. As yet another example, the brightness of the AR content 402A may be increased. Combinations of such enhancements may be used to improve the visibility and readability of the AR content 402A.

FIG. 4B illustrates modified AR content 402B that has larger fonts with an inverted background. When the HMD 400 detects that the amount of movement is less than the threshold amount, it may revert the display of the AR content 402B back to the initial state (e.g., AR content 402A).

Figure 5:
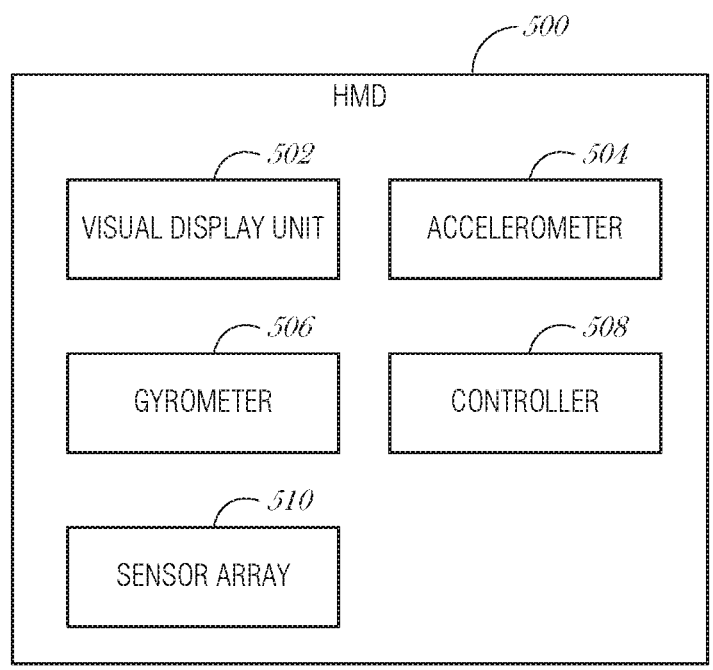
FIG. 5 is a schematic drawing illustrating an HMD, according to an embodiment.

FIG. 5 is a schematic drawing illustrating an HMD 500, according to an embodiment. The HMD 500 includes a visual display unit 502, an accelerometer 504, a gyrometer 506, a controller 508, and an optional inward-facing sensor array 510.

The visual display unit 502 is operable to present a displayed image to the wearer (e.g., user) of the HMD 500. The visual display unit 502 may operate in any manner including projecting images onto a translucent surface between the user's eye(s) and the outer world, the translucent surface may implement mirrors, lenses, prisms, color filters, or other optical apparatus to generate an image. The visual display unit 502 may operate by projecting images directly onto the user's retinas. In general, the visual display unit 502 operates to provide an augmented reality (AR) experience where the user is able to view most of the real world around her with the computer generated image (CGI) (e.g., AR content) being a relatively small portion of the user's field of view. The mixture of the virtual reality images and the real-world experience provides an immersive, mobile, and flexible experience.

The HMD 500 includes an inertial tracking system that employs a sensitive inertial measurement unit (IMU). The IMU may include the accelerometer 504 and the gyrometer 506, and optionally includes a magnetometer (not shown). The IMU is an electronic device that measures a specific force, angular rate, and sometimes magnetic field around the HMD 500. The IMU may calculate six degrees of freedom allowing the HMD 500 to align AR content to the physical world or to generally determine the position or movement of the user's head.

The controller 508 may use data from the IMU (e.g., accelerometer 504 or gyrometer 506) to determine whether the HMD 500 is moving more than a threshold amount. The threshold may be predefined, such as by a manufacturer, or set by a user (e.g., a sales person or an end user). As an example, the user may set the threshold using some graded scale, such as from "low sensitivity" to "medium" or "high sensitivity." When in low sensitivity mode, the HMD 500 may not enhance AR content until it experiences a large amount of movement or some movement over a longer period. In contrast, when in high sensitivity mode, the HMD 500 may enhance the AR content after experiencing less jarring movement or movement over a shorter period of time.

An optional sensor array 510 may be used to determine an amount of movement of the HMD 500 in relation to a user's eyes, face, or skin. The motion may be tracked or sensed by an inward-facing video camera or some other optical sensor (e.g., infrared). Other mechanical, electromechanical, acoustic, or optical sensor systems may be used to detect motion of the HMD 500 relative to the user.

In operation, while the user is wearing the HMD 500, the HMD 500 may monitor the movement of the HMD 500 or the movement of the user relative to the HMD 500). Based on the configuration, the HMD 500 may monitor for an instantaneous movement threshold or an average-over-time movement threshold. The instantaneous movement threshold may be a large jolt or motion that may cause the user to be distracted or disoriented for a brief period afterwards. Enhancing the AR content may be used to accommodate for the distraction or disorientation.

An average-over-time movement threshold may be calculated on a period, such as the previous ten seconds. The period used for the average-over-time calculation may be configurable. The user may configure a specific amount of time to use in the calculation, such as 5-second interval, 10-second interval, or 20-second interval. Alternatively, the user may configure the interval indirectly using a graded scale. For example, the user may select "less sensitive" as the setting, which corresponds to a 20-second interval. Thus, until the HMD 500 experiences a threshold amount of movement averaged over twenty seconds, the HMD 500 will not enhance the AR content.

Figure 6:
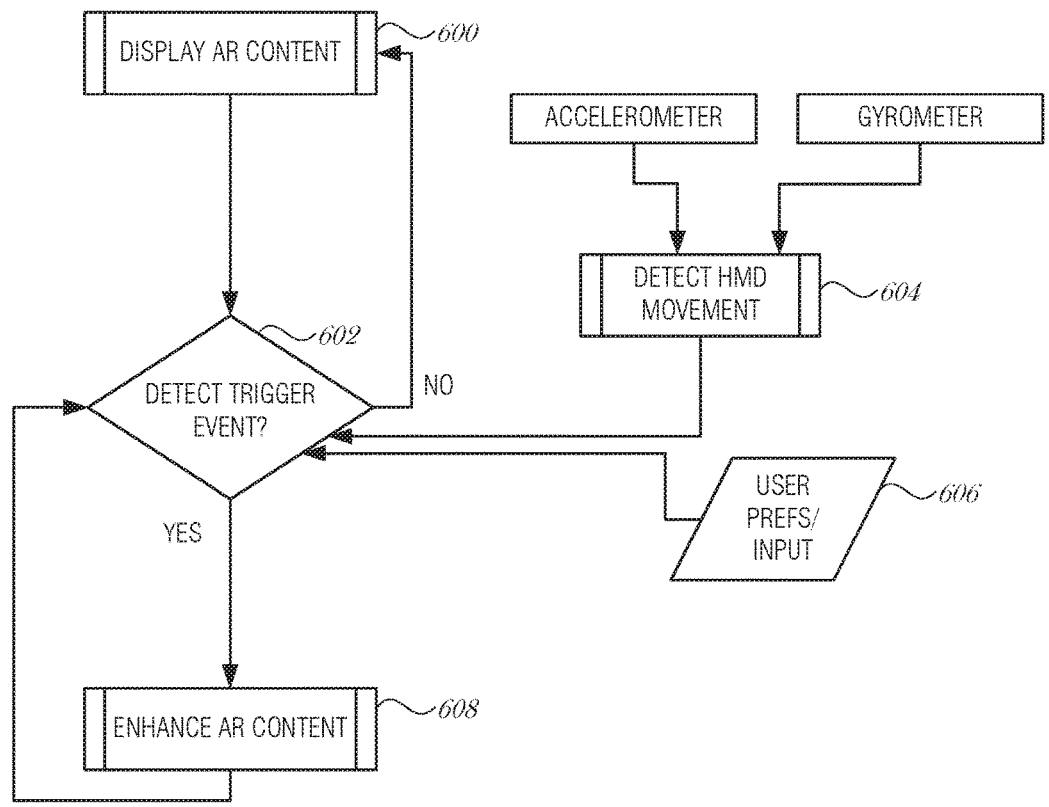
FIG. 6 is a flowchart illustrating control and data flow, according to an embodiment.

FIG. 6 is a flowchart illustrating control and data flow, according to an embodiment. AR content is displayed (operation 600). The AR content may be displayed in an initial format, such as when the user first puts on the HMD and is typically not moving much.

At detection operation 602, the HMD determines whether a trigger event is detected. The determination may be performed at regular intervals, such as every second. Trading off power for quicker response, the HMD may perform the trigger determination at much shorter intervals (e.g., every 200 ms). To make the HMD more efficient, the intervals may be longer, such as every thirty seconds.

The HMD uses motion data, such as accelerometer or gyrometer data to detect movement of the HMD (operation 604). Based on the head motion data and optional user preferences (data 606), the HMD may determine whether the trigger event occurred (e.g., threshold was violated).

When the trigger event is not detected, then the process returns to operation 600 and the AR content is displayed unchanged. When the trigger event is detected, then the AR content is enhanced (operation 608). The process returns to the detection operation 602 to determine whether the trigger event is ongoing. If the trigger event still exists, then the AR content is continually enhanced until the trigger event has ceased.

Figure 7:
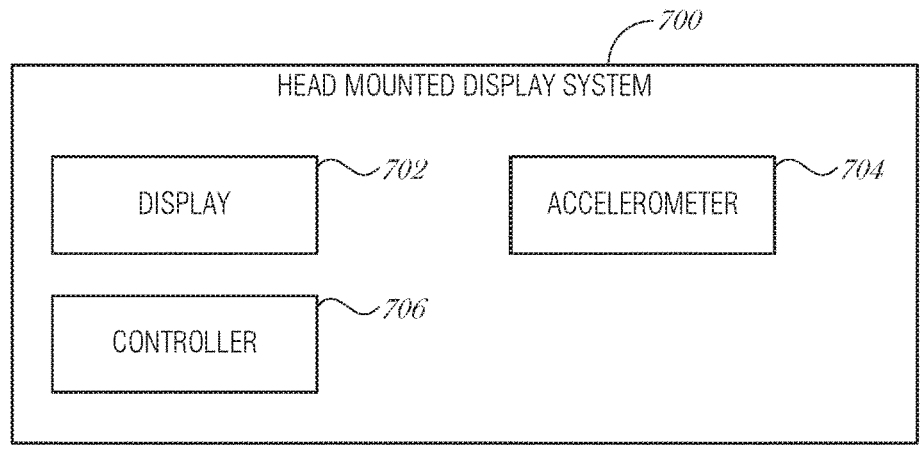
FIG. 7 is a block diagram illustrating head-mounted display system for implementing enhancements in augmented reality content, according to an embodiment

FIG. 7 is a block diagram illustrating head-mounted display system 700 for implementing enhancements in augmented reality content, according to an embodiment. The system 700 may include a see-through display device 702, an accelerometer 704, and a controller 706.

The see-through display device 702 may be configured to display augmented reality content in a field of view to a user of the system 700, the augmented reality content in an initial format.

The controller 706 may be configured to detect a trigger event, the trigger event based on motion of the head mounted display as measured by the accelerometer 704 and present an enhanced version of the augmented reality content when the trigger event is detected. The augmented reality content may be textual, images, or video. In an embodiment, the augmented reality content comprises textual content.

In an embodiment, to detect the trigger event, the controller 706 is to monitor motion of the head mounted display system 700 for a time interval declare the trigger event when the motion of the head mounted display system 700 is greater than a threshold amount for the time interval. In a related embodiment, to monitor motion of the head mounted display system 700 for the time interval, the controller 706 is to monitor an average motion of the head mounted display system 700 for the time interval. For example, should the head mounted display system 700 move more than 0.5 cm on average over the interval, then the head mounted display system 700 may be considered to move enough to cause issues with seeing or reading the content displayed within. As such, a trigger event may be declared.

In a related embodiment, to monitor motion of the head mounted display system 700 for the time interval, the controller 706 is to monitor a total amount of motion of the head mounted display system 700 over the time interval. For example, an accelerometer 704 may be used to detect motion and a position sensor may be used to detect actual linear distance moved. The linear distance moved may be aggregated such that if the head mounted display system 700 moves more than a threshold aggregate amount, such that the user is assumed to have difficulty seeing or reading the augmented reality content, then the trigger event is declared.

In an embodiment, to monitor motion of the head mounted display system 700 for the time interval, the controller 706 is to monitor a relative motion between the head mounted display system 700 and a user for the time interval. In a related embodiment, to monitor the relative motion between the head mounted display system 700 and the user for the time interval, the controller 706 is to monitor an average motion between the head mounted display system 700 and the user for the time interval. In another related embodiment, to monitor the relative motion between the head mounted display system 700 and the user for the time interval, the controller 706 is to monitor a total amount of motion between the head mounted display system 700 and the user over the time interval. Such measurements for these embodiments are similar to those for measurements of just the head mounted display system 700. Here, the relative movement between the user (e.g., face, eyes, skin) and the head mounted display system 700 may be more disruptive to viewing than just moving the head mounted display system 700. As such, the thresholds may be lower before declaring a trigger event.

In an embodiment, the threshold amount for the time interval is configurable. A user may configure the threshold with a user interface provided within the head mounted display system 700 or with a companion device, such as a smartphone, that interfaces with the head mounted display system 700. The threshold may be configured using objective measurements (e.g., actual measurements or time intervals) or subjective measurements (e.g., using a "more sensitive" setting or a "less sensitive" setting).

In an embodiment, to present the enhanced version of the augmented reality content, the controller 706 is to present an enlarged version of the augmented reality content. In a related embodiment, to present the enhanced version of the augmented reality content, the controller 706 is to present a highlighted region over the augmented reality content. In another related embodiment, to present the enhanced version of the augmented reality content, the controller 706 is to present an opaque background behind the augmented reality content. In another related embodiment, to present the enhanced version of the augmented reality content, the controller 706 is to present the augmented reality content with an increased brightness. Enhancements may be combined. Also, it is understood that the list of enhancements provided here is not exhaustive and that other enhancements may be used to assist a user to see or read augmented reality content.

In an embodiment, the controller 706 is to revert to the initial format of the augmented reality content from the enhanced version of the augmented reality content after a time interval. In related embodiment, the time interval is a preset time. In another related embodiment, the time interval is based on the trigger event. For example, the trigger event may be continually or repeatedly evaluated, such that when the trigger event is found to not exist, the enhancements may be reverted.

Figure 8:
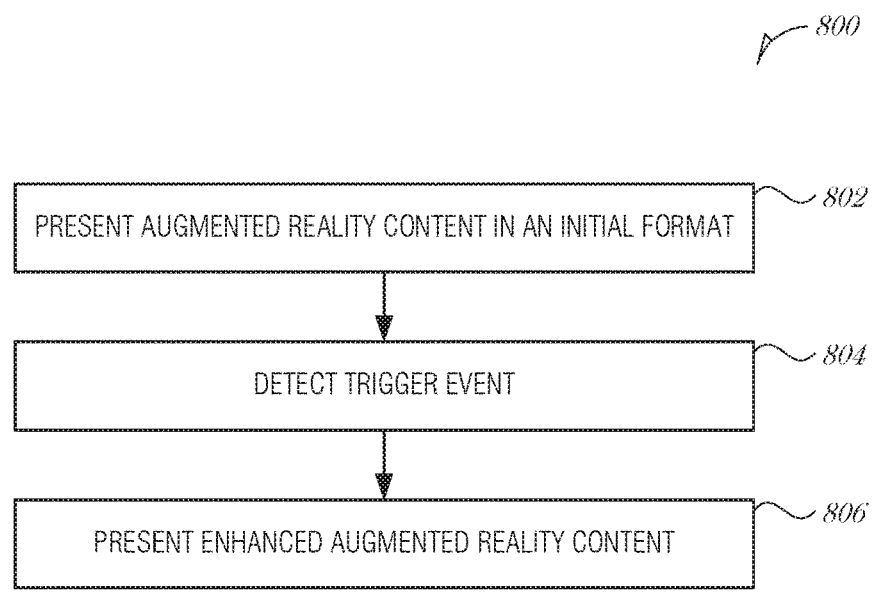
FIG. 8 is a flowchart illustrating a method of implementing enhancements in augmented reality content presented in a head-mounted display, according to an embodiment.

FIG. 8 is a flowchart illustrating a method 800 of implementing enhancements in augmented reality content presented in a head-mounted display, according to an embodiment. At block 802, augmented reality content is presented in an initial format in a head mounted display. The content may be any type of content including text, images, or video. In an embodiment, the augmented reality content comprises textual content.

At block 804, a trigger event is detected, where the trigger event based on motion of the head mounted display. In an embodiment, detecting the trigger event comprises monitoring motion of the head mounted display for a time interval and declaring the trigger event when the motion of the head mounted display is greater than a threshold amount for the time interval. In an embodiment, the threshold amount for the time interval is configurable.

In an embodiment, monitoring motion of the head mounted display for the time interval comprises monitoring an average motion of the head mounted display for the time interval. In a related embodiment, monitoring motion of the head mounted display for the time interval comprises monitoring a total amount of motion of the head mounted display over the time interval.

In an embodiment, monitoring motion of the head mounted display for the time interval comprises monitoring a relative motion between the head mounted display and a user for the time interval. In a further embodiment, monitoring the relative motion between the head mounted display and the user for the time interval comprises monitoring an average motion between the head mounted display and the user for the time interval. In a related embodiment, monitoring the relative motion between the head mounted display and the user for the time interval comprises monitoring a total amount of motion between the head mounted display and the user over the time interval.

At block 806, an enhanced version of the augmented reality content is presented in the head mounted display.

In an embodiment, presenting the enhanced version of the augmented reality content comprises presenting an enlarged version of the augmented reality content. In a related embodiment, wherein presenting the enhanced version of the augmented reality content comprises presenting a highlighted region over the augmented reality content. In a related embodiment, presenting the enhanced version of the augmented reality content comprises presenting an opaque background behind the augmented reality content. In a related embodiment, presenting the enhanced version of the augmented reality content comprises presenting the augmented reality content with an increased brightness. Combinations of these enhancements may be used together.

In an embodiment, the method 800 includes reverting to the initial format of the augmented reality content from the enhanced version of the augmented reality content after a time interval. The time interval may be based on a predetermined timeout, such as ten seconds, or may be determined dynamically, such as by re-evaluating the trigger event and then reverting after the trigger event no longer exists. In an embodiment, the time interval is a preset time. In a related embodiment, the time interval is based on the trigger event.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 9:
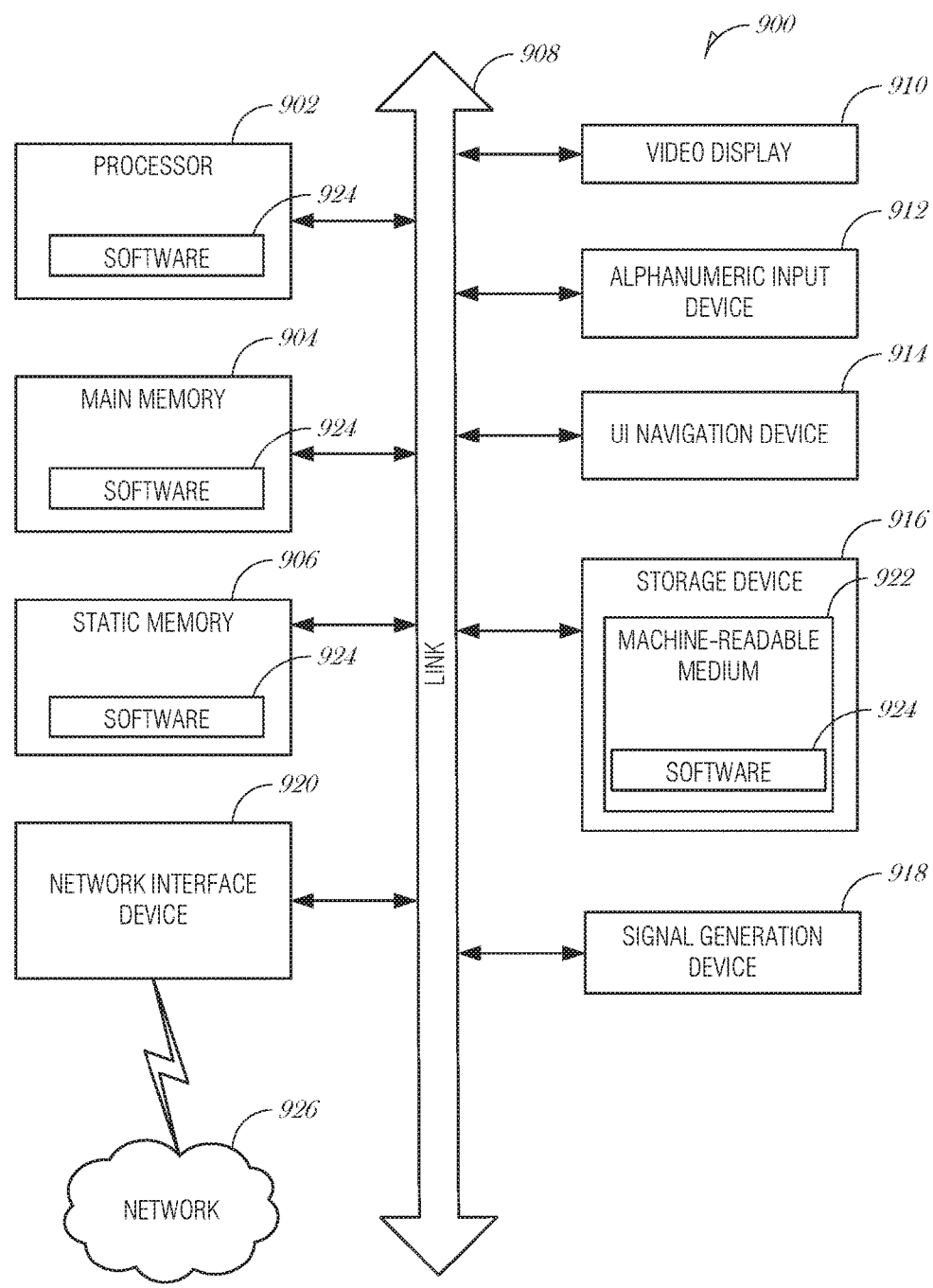
FIG. 9 is a block diagram illustrating an example machine upon which any one or more of the techniques (e.g., methodologies) discussed herein may perform, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, gyrometer, magnetometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth. Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter (such as a device, apparatus, or machine) for implementing enhancements in augmented reality content presented in a head-mounted display comprising: a see-through display device to display augmented reality content in a field of view to a user of the system, the augmented reality content in an initial format; an accelerometer; and a controller to: detect a trigger event, the trigger event based on motion of the head mounted display system as measured by the accelerometer; and present an enhanced version of the augmented reality content when the trigger event is detected.

In Example 2, the subject matter of Example 1 may include, wherein the augmented reality content comprises textual content.

In Example 3, the subject matter of any one of Examples 1 to 2 may include, wherein to detect the trigger event, the controller is to: monitor motion of the head mounted display system for a time interval; and declare the trigger event when the motion of the head mounted display system is greater than a threshold amount for the time interval.

In Example 4, the subject matter of any one of Examples 1 to 3 may include, wherein to monitor motion of the head mounted display system for the time interval, the controller is to monitor an average motion of the head mounted display system for the time interval.

In Example 5, the subject matter of any one of Examples 1 to 4 may include, wherein to monitor motion of the head mounted display system for the time interval, the controller is to monitor a total amount of motion of the head mounted display system over the time interval.

In Example 6, the subject matter of any one of Examples 1 to 5 may include, wherein to monitor motion of the head mounted display system for the time interval, the controller is to monitor a relative motion between the head mounted display system and a user for the time interval.

In Example 7, the subject matter of any one of Examples 1 to 6 may include, wherein to monitor the relative motion between the head mounted display system and the user for the time interval, the controller is to monitor an average motion between the head mounted display system and the user for the time interval.

In Example 8, the subject matter of any one of Examples 1 to 7 may include, wherein to monitor the relative motion between the head mounted display system and the user for the time interval, the controller is to monitor a total amount of motion between the head mounted display system and the user over the time interval.

In Example 9, the subject matter of any one of Examples 1 to 8 may include, wherein the threshold amount for the time interval is configurable.

In Example 10, the subject matter of any one of Examples 1 to 9 may include, wherein to present the enhanced version of the augmented reality content, the controller is to present an enlarged version of the augmented reality content.

In Example 11, the subject matter of any one of Examples 1 to 10 may include, wherein to present the enhanced version of the augmented reality content, the controller is to present a highlighted region over the augmented reality content.

In Example 12, the subject matter of any one of Examples 1 to 11 may include, wherein to present the enhanced version of the augmented reality content, the controller is to present an opaque background behind the augmented reality content.

In Example 13, the subject matter of any one of Examples 1 to 12 may include, wherein to present the enhanced version of the augmented reality content, the controller is to present the augmented reality content with an increased brightness.

In Example 14, the subject matter of any one of Examples 1 to 13 may include, wherein the controller is to revert to the initial format of the augmented reality content from the enhanced version of the augmented reality content after a time interval.

In Example 15, the subject matter of any one of Examples 1 to 14 may include, wherein the time interval is a preset time.

In Example 16, the subject matter of any one of Examples 1 to 15 may include, wherein the time interval is based on the trigger event.

Example 17 includes subject matter (such as a method, means for performing acts, machine readable medium including instructions that when performed by a machine cause the machine to performs acts, or an apparatus to perform) for implementing enhancements in augmented reality content presented in a head-mounted display comprising: presenting, by a head mounted display, augmented reality content in an initial format; detecting a trigger event, the trigger event based on motion of the head mounted display; and presenting, via the head mounted display, an enhanced version of the augmented reality content.

In Example 18, the subject matter of Example 17 may include, wherein the augmented reality content comprises textual content.

In Example 19, the subject matter of any one of Examples 17 to 18 may include, wherein detecting the trigger event comprises: monitoring motion of the head mounted display for a time interval; and declaring the trigger event when the motion of the head mounted display is greater than a threshold amount for the time interval.

In Example 20, the subject matter of any one of Examples 17 to 19 may include, wherein monitoring motion of the head mounted display for the time interval comprises monitoring an average motion of the head mounted display for the time interval.

In Example 21, the subject matter of any one of Examples 17 to 20 may include, wherein monitoring motion of the head mounted display for the time interval comprises monitoring a total amount of motion of the head mounted display over the time interval.

In Example 22, the subject matter of any one of Examples 17 to 21 may include, wherein monitoring motion of the head mounted display for the time interval comprises monitoring a relative motion between the head mounted display and a user for the time interval.

In Example 23, the subject matter of any one of Examples 17 to 22 may include, wherein monitoring the relative motion between the head mounted display and the user for the time interval comprises monitoring an average motion between the head mounted display and the user for the time interval.

In Example 24, the subject matter of any one of Examples 17 to 23 may include, wherein monitoring the relative motion between the head mounted display and the user for the time interval comprises monitoring a total amount of motion between the head mounted display and the user over the time interval.

In Example 25, the subject matter of any one of Examples 17 to 24 may include, wherein the threshold amount for the time interval is configurable.

In Example 26, the subject matter of any one of Examples 17 to 25 may include, wherein presenting the enhanced version of the augmented reality content comprises presenting an enlarged version of the augmented reality content.

In Example 27, the subject matter of any one of Examples 17 to 26 may include, wherein presenting the enhanced version of the augmented reality content comprises presenting a highlighted region over the augmented reality content.

In Example 28, the subject matter of any one of Examples 17 to 27 may include, wherein presenting the enhanced version of the augmented reality content comprises presenting an opaque background behind the augmented reality content.

In Example 29, the subject matter of any one of Examples 17 to 28 may include, wherein presenting the enhanced version of the augmented reality content comprises presenting the augmented reality content with an increased brightness.

In Example 30, the subject matter of any one of Examples 17 to 29 may include, reverting to the initial format of the augmented reality content from the enhanced version of the augmented reality content after a time interval.

In Example 31, the subject matter of any one of Examples 17 to 30 may include, wherein the time interval is a preset time.

In Example 32, the subject matter of any one of Examples 17 to 31 may include, wherein the time interval is based on the trigger event.

Example 33 includes at least one machine-readable medium including instructions, which when executed by a machine, cause the machine to perform operations of any of the Examples 17-32.

Example 34 includes an apparatus comprising means for performing any of the Examples 17-32.

Example 35 includes subject matter (such as a device, apparatus, or machine) for implementing enhancements in augmented reality content presented in a head-mounted display comprising: means for presenting, by a head mounted display, augmented reality content in an initial format; means for detecting a trigger event, the trigger event based on motion of the head mounted display; and means for presenting, via the head mounted display, an enhanced version of the augmented reality content.

In Example 36, the subject matter of Example 35 may include, wherein the augmented reality content comprises textual content.

In Example 37, the subject matter of any one of Examples 35 to 36 may include, wherein the means for detecting the trigger event comprise: means for monitoring motion of the head mounted display for a time interval; and means for declaring the trigger event when the motion of the head mounted display is greater than a threshold amount for the time interval.

In Example 38, the subject matter of any one of Examples 35 to 37 may include, wherein the means for monitoring motion of the head mounted display for the time interval comprise means for monitoring an average motion of the head mounted display for the time interval.

In Example 39, the subject matter of any one of Examples 35 to 38 may include, wherein the means for monitoring motion of the head mounted display for the time interval comprise means for monitoring a total amount of motion of the head mounted display over the time interval.

In Example 40, the subject matter of any one of Examples 35 to 39 may include, wherein the means for monitoring motion of the head mounted display for the time interval comprise means for monitoring a relative motion between the head mounted display and a user for the time interval.

In Example 41, the subject matter of any one of Examples 35 to 40 may include, wherein the means for monitoring the relative motion between the head mounted display and the user for the time interval comprise means for monitoring an average motion between the head mounted display and the user for the time interval.

In Example 42, the subject matter of any one of Examples 35 to 41 may include, wherein the means for monitoring the relative motion between the head mounted display and the user for the time interval comprise means for monitoring a total amount of motion between the head mounted display and the user over the time interval.

In Example 43, the subject matter of any one of Examples 35 to 42 may include, wherein the threshold amount for the time interval is configurable.

In Example 44, the subject matter of any one of Examples 35 to 43 may include, wherein the means for presenting the enhanced version of the augmented reality content comprise means for presenting an enlarged version of the augmented reality content.

In Example 45, the subject matter of any one of Examples 35 to 44 may include, wherein the means for presenting the enhanced version of the augmented reality content comprise means for presenting a highlighted region over the augmented reality content.

In Example 46, the subject matter of any one of Examples 35 to 45 may include, wherein the means for presenting the enhanced version of the augmented reality content comprise means for presenting an opaque background behind the augmented reality content.

In Example 47, the subject matter of any one of Examples 35 to 46 may include, wherein the means for presenting the enhanced version of the augmented reality content comprise means for presenting the augmented reality content with an increased brightness.

In Example 48, the subject matter of any one of Examples 35 to 47 may include, means for reverting to the initial format of the augmented reality content from the enhanced version of the augmented reality content after a time interval.

In Example 49, the subject matter of any one of Examples 35 to 48 may include, wherein the time interval is a preset time.

In Example 50, the subject matter of any one of Examples 35 to 49 may include, wherein the time interval is based on the trigger event.

Example 51 includes subject matter (such as a device, apparatus, or machine) for implementing enhancements in augmented reality content presented in a head-mounted display comprising: a processor subsystem; a memory including instructions, which when executed by the processor subsystem, cause the processor subsystem to: present, by a head mounted display, augmented reality content in an initial format; detect a trigger event, the trigger event based on motion of the head mounted display; and present, via the head mounted display, an enhanced version of the augmented reality content.

In Example 52, the subject matter of Example 51 may include, wherein the augmented reality content comprises textual content.

In Example 53, the subject matter of any one of Examples 51 to 52 may include, wherein the instructions to detect the trigger event comprise instructions to: monitor motion of the head mounted display for a time interval; and declare the trigger event when the motion of the head mounted display is greater than a threshold amount for the time interval.

In Example 54, the subject matter of any one of Examples 51 to 53 may include, wherein the instructions to monitor motion of the head mounted display for the time interval comprise instructions to monitor an average motion of the head mounted display for the time interval.

In Example 55, the subject matter of any one of Examples 51 to 54 may include, wherein the instructions to monitor motion of the head mounted display for the time interval comprise instructions to monitor a total amount of motion of the head mounted display over the time interval.

In Example 56, the subject matter of any one of Examples 51 to 55 may include, wherein the instructions to monitor motion of the head mounted display for the time interval comprise instructions to monitor a relative motion between the head mounted display and a user for the time interval.

In Example 57, the subject matter of any one of Examples 51 to 56 may include, wherein the instructions to monitor the relative motion between the head mounted display and the user for the time interval comprise instructions to monitor an average motion between the head mounted display and the user for the time interval.

In Example 58, the subject matter of any one of Examples 51 to 57 may include, wherein the instructions to monitor the relative motion between the head mounted display and the user for the time interval comprise instructions to monitor a total amount of motion between the head mounted display and the user over the time interval.

In Example 59, the subject matter of any one of Examples 51 to 58 may include, wherein the threshold amount for the time interval is configurable.

In Example 60, the subject matter of any one of Examples 51 to 59 may include, wherein the instructions to present the enhanced version of the augmented reality content comprise instructions to present an enlarged version of the augmented reality content.

In Example 61, the subject matter of any one of Examples 51 to 60 may include, wherein the instructions to present the enhanced version of the augmented reality content comprise instructions to present a highlighted region over the augmented reality content.

In Example 62, the subject matter of any one of Examples 51 to 61 may include, wherein the instructions to present the enhanced version of the augmented reality content comprise instructions to present an opaque background behind the augmented reality content.

In Example 63, the subject matter of any one of Examples 51 to 62 may include, wherein the instructions to present the enhanced version of the augmented reality content comprise instructions to present the augmented reality content with an increased brightness.

In Example 64, the subject matter of any one of Examples 51 to 63 may include, instructions to revert to the initial format of the augmented reality content from the enhanced version of the augmented reality content after a time interval.

In Example 65, the subject matter of any one of Examples 51 to 64 may include, wherein the time interval is a preset time.

In Example 66, the subject matter of any one of Examples 51 to 65 may include, wherein the time interval is based on the trigger event.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A head-mounted display system for implementing enhancements in augmented reality content, the system comprising:
    a see-through display device to display augmented reality content in a field of view to a user of the system, the augmented reality content in an initial format;
    an inward facing sensor to monitor facial skin of the user;
    an accelerometer; and
    a controller to:
        detect a trigger event, the trigger event based on a relative motion between the head mounted display system and the user as sensed by the inward-facing sensor; and
        present an alternate version of the augmented reality content when the trigger event is detected,
    wherein to detect the trigger event, the controller is to:
        monitor the relative motion of the head mounted display system for a time interval; and
        declare the trigger event when the relative motion of the head mounted display system is greater than a threshold amount for the time interval, wherein the threshold amount for the time interval is configurable.

2. The system of claim 1, wherein the augmented reality content comprises textual content.

3. The system of claim 1, wherein to monitor the relative motion between the head mounted display system and the user for the time interval, the controller is to monitor an average motion between the head mounted display system and the user for the time interval.

4. The system of claim 1, wherein to monitor the relative motion between the head mounted display system and the user for the time interval, the controller is to monitor a total amount of motion between the head mounted display system and the user over the time interval.

5. The system of claim 1, wherein to present the alternate version of the augmented reality content, the controller is to present an enlarged version of the augmented reality content.

6. The system of claim 1, wherein to present the alternate version of the augmented reality content, the controller is to present a highlighted region over the augmented reality content.

7. The system of claim 1, wherein to present the alternate version of the augmented reality content, the controller is to present an opaque background behind the augmented reality content.

8. The system of claim 1, wherein to present the alternate version of the augmented reality content, the controller is to present the augmented reality content with an increased brightness.

9. The system of claim 1, wherein the controller is to revert to the initial format of the augmented reality content from the alternate version of the augmented reality content after a second time interval.

10. The system of claim 9, wherein the second time interval is a preset time.

11. The system of claim 9, wherein the second time interval is based on the trigger event.

12. The system of claim 1, wherein the inward-facing sensor includes a camera.

13. The system of claim 1, wherein the inward-facing sensor includes an infrared sensor.

14. A method of implementing enhancements in augmented reality content presented in a head-mounted display, the method comprising:
    presenting, by a head mounted display worn by a user, augmented reality content in an initial format;
    detecting a trigger event, the trigger event based on a relative motion between the head mounted display and the user as sensed by an inward-facing sensor that monitors facial skin of the user, by:
        monitoring the relative motion of the head mounted display with respect to the facial skin for a time interval; and
        declaring the trigger event when the relative motion of the head mounted display is greater than a threshold amount for the time interval, wherein the threshold amount for the time interval is configurable; and
    presenting, via the head mounted display, an alternate version of the augmented reality content.

15. The method of claim 14, wherein the augmented reality content comprises textual content.

16. The method of claim 14, wherein monitoring motion of the head mounted display for the time interval comprises monitoring an average motion of the head mounted display for the time interval.

17. The method of claim 14, wherein monitoring motion of the head mounted display for the time interval comprises monitoring a total amount of motion of the head mounted display over the time interval.

18. At least one non-transitory machine-readable medium including instructions, which when executed by a machine, cause the machine to:
- present, by a head mounted display worn by a user, augmented reality content in an initial format;
- detect a trigger event, the trigger event based on a relative motion between the head mounted display and the user as sensed by an inward-facing sensor that monitors facial skin of the user, by:
  - monitoring the relative motion of the head mounted display with respect to the facial skin for a time interval; and
  - declaring the trigger event when the relative motion of the head mounted display is greater than a threshold amount for the time interval, wherein the threshold amount for the time interval is configurable; and
- present, via the head mounted display, an alternate version of the augmented reality content.

19. The at least one non-transitory machine-readable medium of claim 18, wherein the instructions to present the alternate version of the augmented reality content comprise instructions to present a highlighted region over the augmented reality content.

20. The at least one non-transitory machine-readable medium of claim 18, further comprising instructions to revert to the initial format of the augmented reality content from the alternate version of the augmented reality content after a second time interval.

\* \* \* \* \*